United States Patent [19]
Chadwell

[11] Patent Number: 5,662,533
[45] Date of Patent: Sep. 2, 1997

[54] GOLF BALL LOCATOR APPARATUS

[76] Inventor: Donald Chadwell, 416 W. Country Club Dr., Edmond, Okla. 73003

[21] Appl. No.: 343,032

[22] Filed: Nov. 21, 1994

[51] Int. Cl.$^6$ .................................................. A63B 57/00
[52] U.S. Cl. .......................... 473/353; 473/131; 473/407
[58] Field of Search ..................... 273/213, 32 B, 273/58 G; 324/326, 234, 243, 239; 473/353, 131, 407

[56] References Cited

U.S. PATENT DOCUMENTS

| | | | |
|---|---|---|---|
| 3,868,692 | 2/1975 | Woodard et al. | 273/213 X |
| 4,660,039 | 4/1987 | Barricks | 342/27 |
| 5,046,839 | 9/1991 | Krangle | 273/32 B X |
| 5,112,055 | 5/1992 | Barnhill | 273/213 |
| 5,132,622 | 7/1992 | Valentino | 273/213 X |
| 5,228,697 | 7/1993 | Gulick | 273/213 |
| 5,370,387 | 12/1994 | Baker | 273/213 X |
| 5,423,549 | 6/1995 | Englmeier | 273/213 |
| 5,427,378 | 6/1995 | Murphy | 273/213 X |

FOREIGN PATENT DOCUMENTS

| | | | |
|---|---|---|---|
| 4051971 | 2/1992 | Japan | 273/213 |
| 2188415 | 9/1987 | United Kingdom | 273/32 B |
| 8902768 | 4/1989 | WIPO | 273/213 |

*Primary Examiner*—Jessica Harrison
*Assistant Examiner*—Michael O'Neill
*Attorney, Agent, or Firm*—Snell & Wilmer L.L.P.

[57] ABSTRACT

A golf ball locating apparatus and a method of applying a reflective coating to the golf ball. The apparatus involves a handheld apparatus which locates a wayward golf ball and identifies its relative position to the handheld apparatus. The handheld apparatus is structured in two preferred embodiments: the first is a handheld apparatus that fits into a user's pocket; the second is a shaft arrangement which has two extendable wings to form a "T" shape. The pocket sized embodiment has a forward facing window to direct a beam from the apparatus. The beam of radiation reacts with a clear coating on the golf ball and is sensed by the apparatus which then illustrates, via a display, the relative location of the golf ball. The "T" embodiment has antennas embedded into the wings which emit a field which are disturbed by the coating on the golf ball; lights associated with the antennas are illuminated to show the operator which antenna is in the closest proximity to the golf ball. The coating on the golf-ball is applied through a variety of techniques and preferably covers the entirety of the golf ball. One methodology uses an impregnated cloth to wipe the golf ball immediately prior to placing the ball in-play. This assures a coating on the golf ball during each play.

13 Claims, 5 Drawing Sheets

GOLF BALL LOCATOR APPARATUS

BACKGROUND OF THE INVENTION

This invention relates to sporting goods and more particularly to instruments used in the game of golf.

As the game of golf has become more popular, a wide variety of aids have been developed to speed the game, assist various aspects of the game, or to assist the golfer in improving his or her score.

The game of golf is controlled by a large number of rules which dictate when "penalty strokes" must be added to the score. If these penalty strokes are minimized or eliminated, then the golfer's effectiveness can be improved.

One such rule relates to lost balls or balls that cannot be located because they are in the rough. The rules provide for the taking of penalty strokes when a ball cannot be found.

Further, golf balls themselves are no longer inexpensive and the loss of balls during the game can become an aggravating experience.

Numerous different apparatuses have been developed to assist the golfer in locating a wayward ball. These efforts have generally been divided between modifying the golf ball itself, and the development of instruments to locate the ball.

In the area of golf ball modification falls such examples as: U.S. Pat. No. 5,112,055, entitled "Golf Ball Including Sound Emitting Means" issued to Barnhill on May 12, 1992: U.S. Pat. No. 4,660,039, entitled "System for Locating a Sport Object" and issued to Barricks et al. on Apr. 21, 1987; and U.S. Pat. No. 5,228,697, issued to Gulick et al. on Jul. 20, 1993, and entitled "Glow-in-the-Dark Golf Ball". These devices, respectively, attempt to make the ball easier to find by: implanting beepers in the golf ball, applying reflective tape to the outside of the golf ball, and coloring the golf ball.

Although each of these techniques do provide a heightened level of "findability", they also are extremely disruptive to the traditional game of golf and require highly specialized and obvious equipment modification. Even more disturbing is the fact that these modifications to the golf ball have affects on the ball's flight characteristics which may cost the player more strokes than they save in penalties.

An example of the apparatus which have been developed in assisting in finding a golf ball include U.S. Pat. No. 5,132,622, entitled "Method and Apparatus for Locating and Retrieving a Golf Ball having a Metal Center" issued to Valentino on Jul. 21, 1992 (incorporated hereinto by reference). In this application, again the golf ball must be modified to include an iron or other metal center. This modification dramatically affects the golf ball's playing characteristic.

Further, this apparatus merely indicates when the end of the probe is "near" the ball rather than any true directional aid.

It is clear that there is a need for an effective golf ball locating apparatus.

SUMMARY OF THE INVENTION

The invention involves both a golf ball locating apparatus and a method of applying a reflective coating to the golf ball. The apparatus includes a handheld device which locates a wayward golf ball and identifies its relative position to the handheld apparatus.

The handheld apparatus is structured in two preferred embodiments: the first is a handheld apparatus that fits into a users pocket; the second is a shaft arrangement which has two extendable wings to form a 37 T" shape.

The pocket sized embodiment has a forward facing window to direct a beam from the apparatus. The beam of radiation from the window reacts with a clear coating on the golf ball and is sensed by the apparatus which then illustrates, via a display, the relative location of the golf ball to the handheld apparatus.

The "T" embodiment has antennas embedded into the wings which emit a field which are disturbed by the coating on the golf ball; lights associated with the antennas are illuminated to show the operator which antenna is in the closest proximity to the golf ball and thereby locate the exact position of the golf ball relative to the "T" embodiment.

The method of applying the coating to the golf-ball is accomplished through a variety of techniques and preferably covers the entirety of the golf ball. One methodology uses an impregnated cloth to wipe the golf ball immediately prior to placing the ball in-play. This assures a coating on the golf ball during each play.

The apparatus used to sense the presence of the ball utilizes a variety of techniques well known to those of ordinary skill in the art. The preferred embodiment generates a high-frequency electro-magnetic field and monitors this field for changes caused by ferrous or non-ferrous metal objects. In this application, a thin clear film of metal is applied to the entirety of the golf ball permitting the metal coating on the golf ball to change the field and thereby be detected. This technique is often referred to as metal detection due to its common usage in locating hidden metal objects.

Another technique is through the use of radar. A metal coating on the golf ball is reflective of radio waves while non-metal coatings do not reflect. This permits a radar unit to both detect and to establish distance based on the time for reflection.

Other techniques used for the detection include applying a selected clear coating onto the golf ball which reflects radiation (such as infra-red). The apparatus creates the radiation and then scans for its reflection using a filter and charge-coupled-device (CCD). The use of a CCD is preferred as it allows for not just sensing of the reflected rays but also the direction the reflection was received.

Those of ordinary skill in the art readily recognize other methodologies which serve this function.

In the preferred embodiment, the "T" shaped detector, when used in conjunction with the metal detecting technology, has multiple sensing antennas located throughout the two winged portions. Each antenna senses a unique field disturbance from the metal coating on the ball. Using these varying field disturbances, a computer, acting as a controller, is able to identify which antenna is closest to the ball. Using either a variable pitch buzzer, other auditory signal, or lights associated with the portion of the winged member associated with the antenna, the computer "directs" the user to the exact location of the metal coated ball.

The invention, together with various embodiments thereof, will be more fully described by the accompanying drawings and the following descriptions thereof.

DRAWINGS IN BRIEF

Figure 2A:
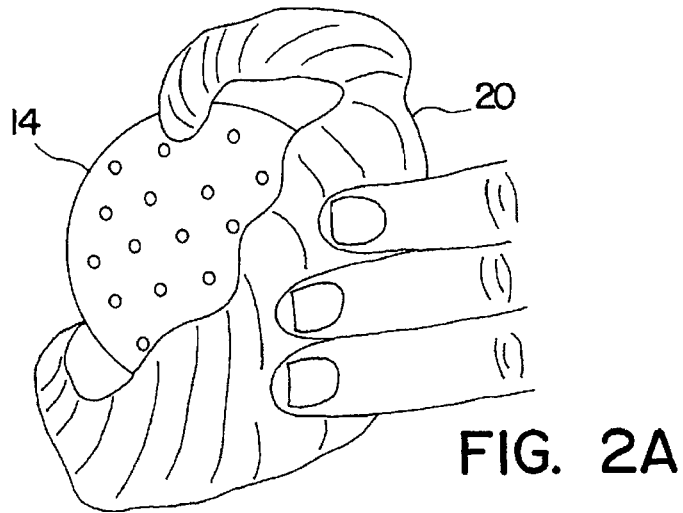
Figure 2B:
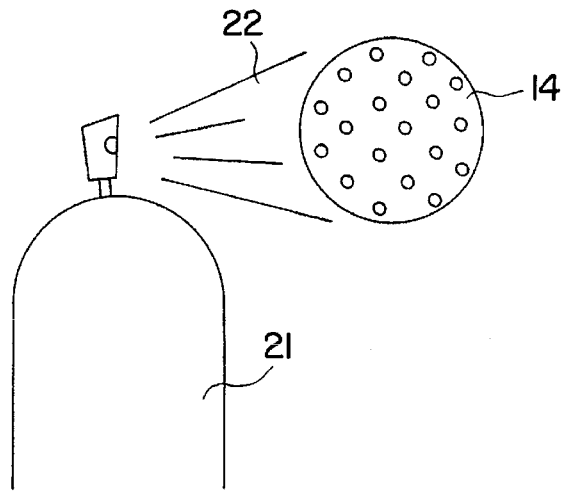
Figure 2C:
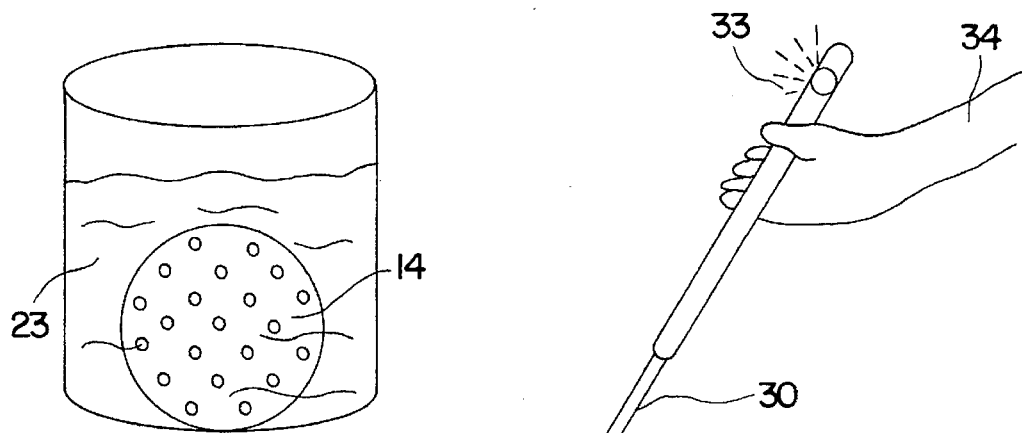

FIGS. 2A, 2B, and 2C illustrate three different ways that a coating is put onto the golf ball.

Figure 3:
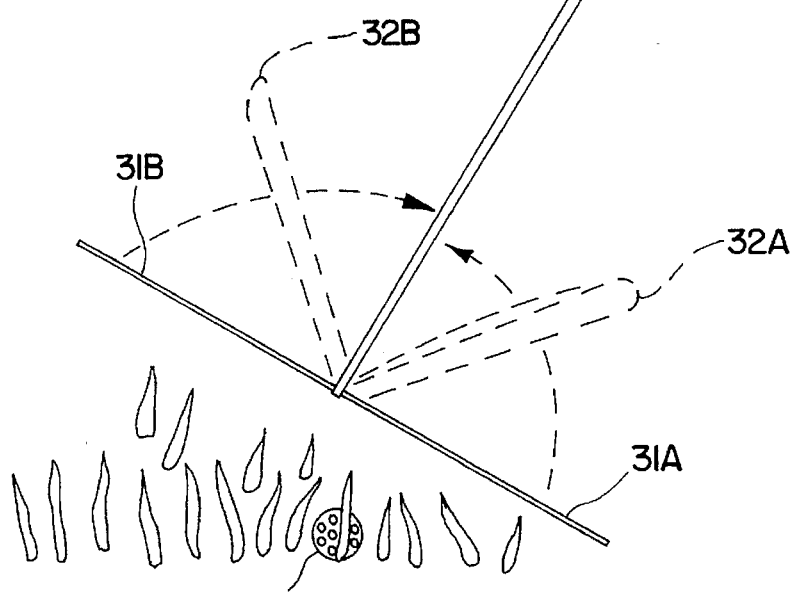

FIG. 3 is a perspective view of the "T" shaped embodiment of the invention in use.

Figure 4:
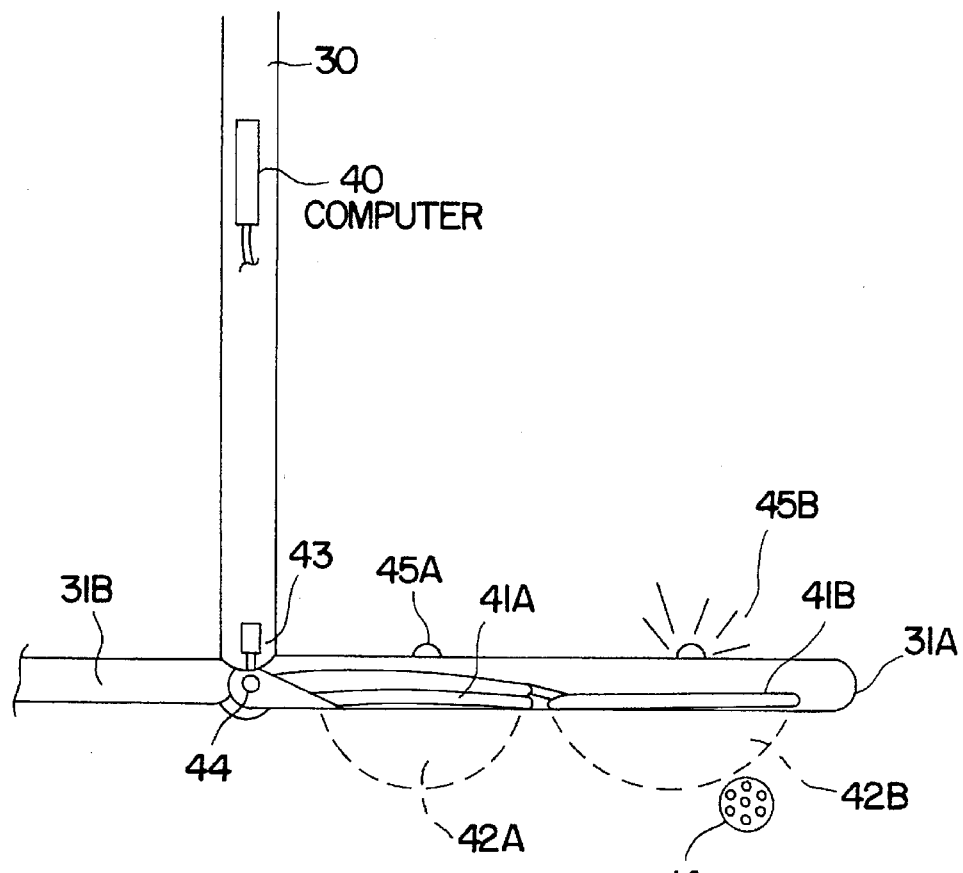

FIG. 4 is a close-up view of the "T" shaped embodiment showing the use of multiple antenna for locating a ball.

Figure 5:
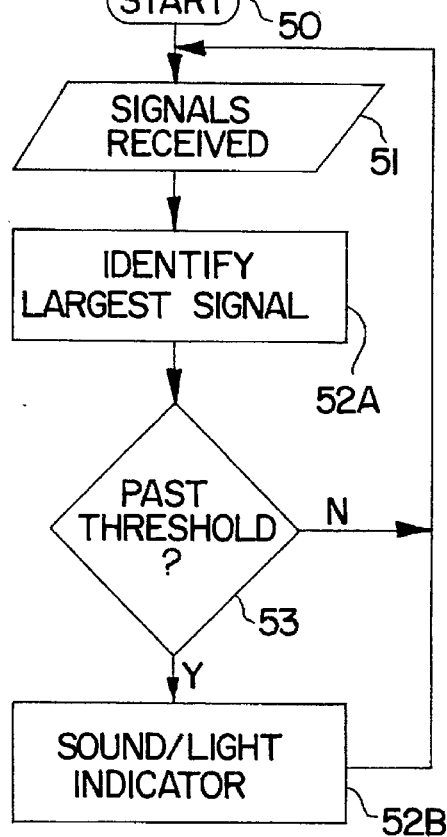

FIG. 5 is a flow-chart of the preferred embodiment illustrating the operation of the computer contained within the "T" shaped embodiment.

Figure 6:
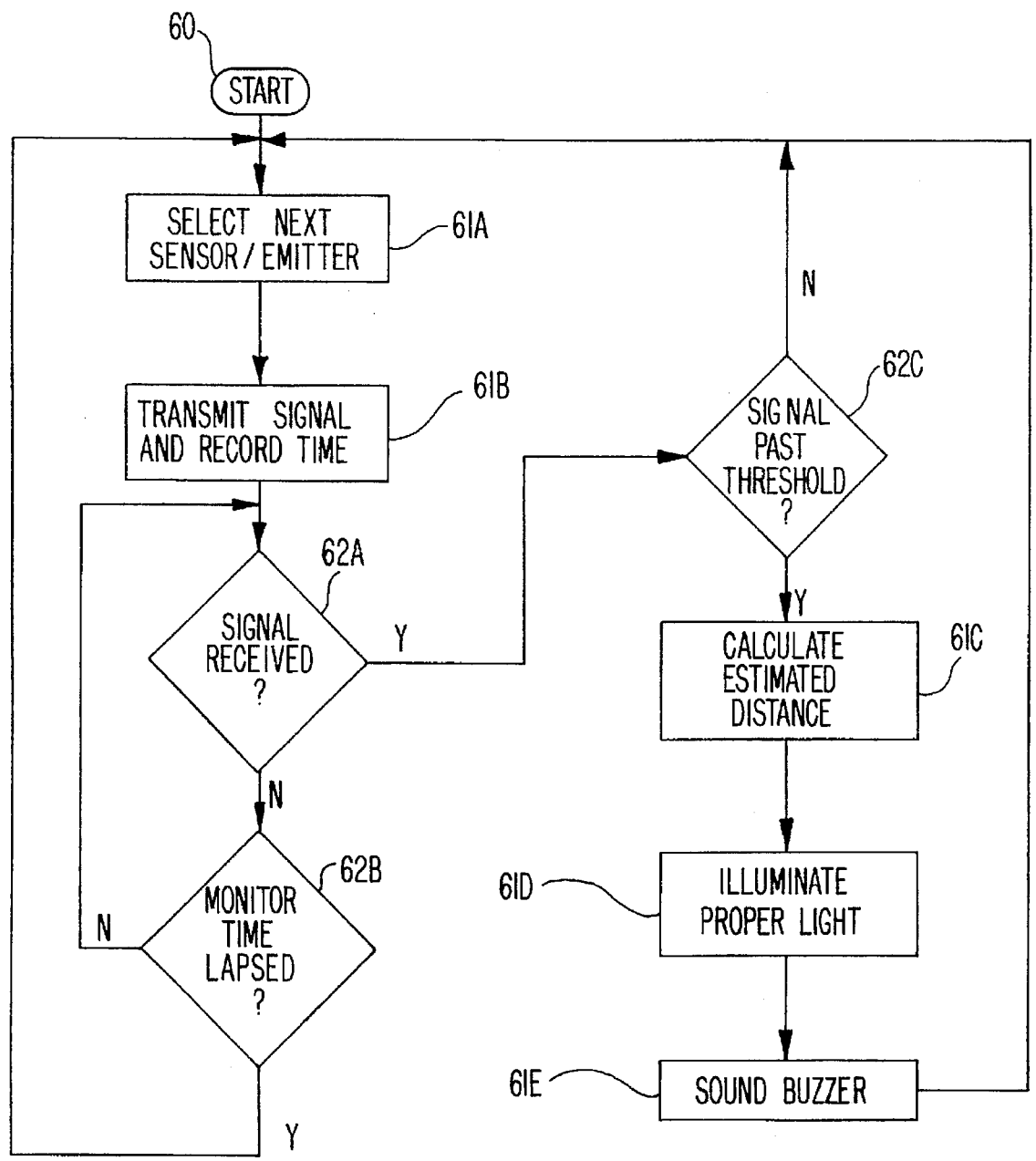

FIG. 6 is a flow-chart of the computer operation of the handheld pocket-sized embodiment of the invention.

DRAWINGS IN DETAIL

Figures 1A, 1B:
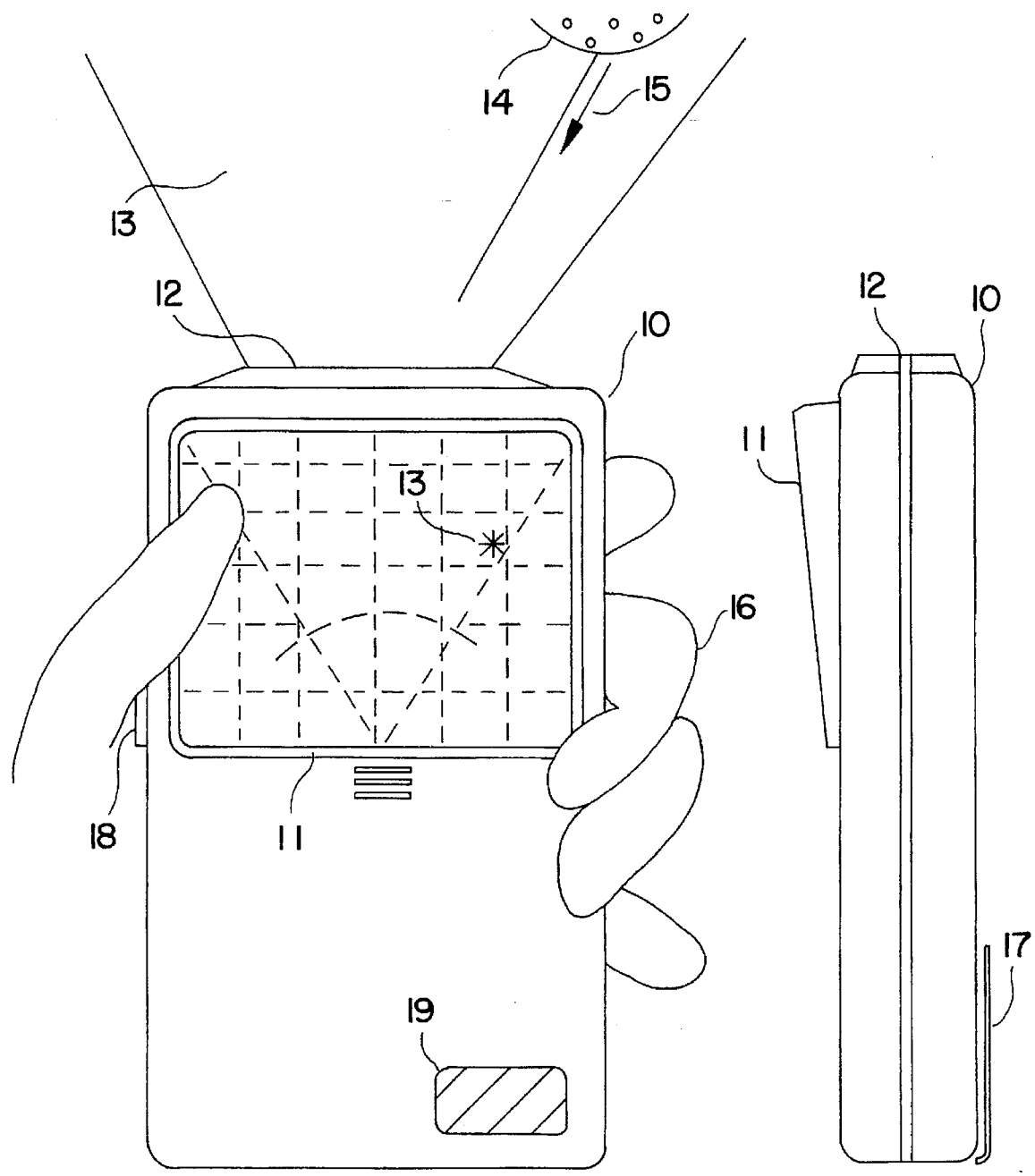
FIGS. 1A and 1B are front and side views respectively of the handheld pocket-sized embodiment of the detector.

FIGS. 1A is a front view of the handheld pocket sized embodiment of the detector.

Operator 16 is able to hold locating apparatus 10 easily in his/her hand. Locating apparatus 10 also fits into a pocket of operator 16.

By depressing button 18, locating apparatus 10 is activated and a signal is emitted through window 12 as shown by arrow 15. Window 12 is structured such that the emissions from window 12 cover a selected forward view 13. As these emissions 15 contact the coating on golf ball 14, they are reflected and are picked up by a CCD-type sensor contained within locating apparatus 10. In some embodiments of window 12, a filter is used to control the type or amount of light received by the sensor (not shown).

A computer within locating apparatus 10 uses the signals from the CCD-type sensor and generates a locating light 13 on display 11. This locating light 13 gives both a direction and approximate distance from locating apparatus 10 to golf ball 14. Besides locating light 13, the computer additionally informs the operator 16 of the "sighting" of the golf ball 14 via a buzzing emitted by speaker 19.

In this manner, operator 16 is able to "sweep" an area listening for the audio alarm and then to "home in" on the golf ball 14 using display 11.

FIG. 1B is a side view respectively of the handheld pocket sized embodiment of the detector.

Locator 10 is thin allowing it to be stored in a pocket of the operator's clothes or golf-bag. Display 11 is slightly tilted relative to the case so as to provide for enhanced viewing. Window 12 is positioned at a forward end of the casing while battery supply cover 17 is located at the aft end. Batteries, not shown, are used to provide the power for the locator 10 and are inserted into the casing via battery supply cover 17.

Figure 1C:
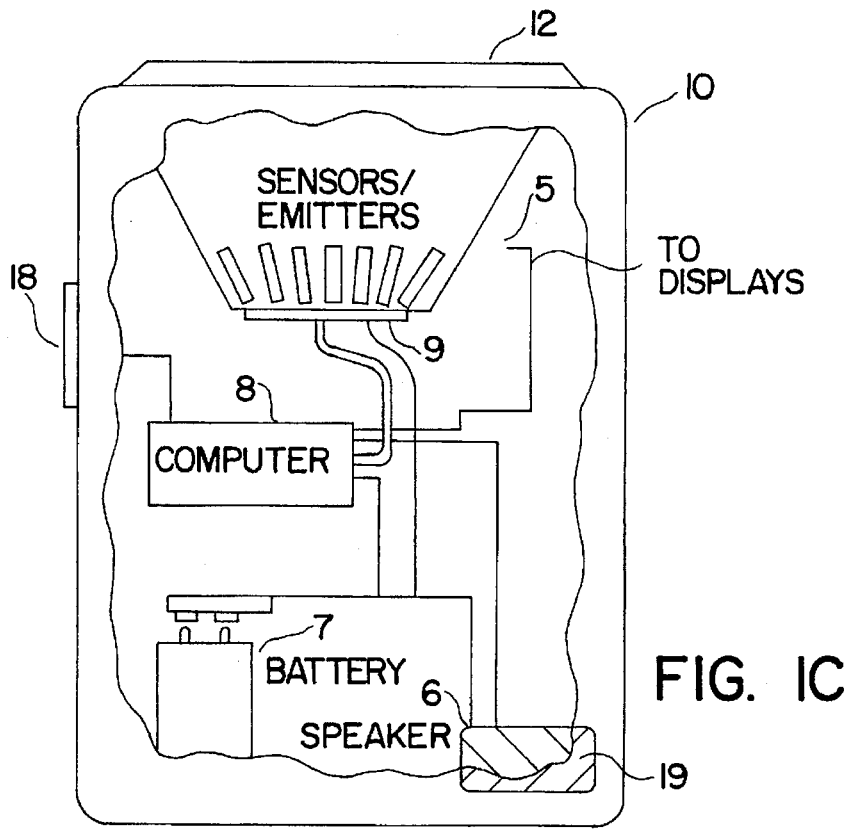
FIG. 1C is a functional layout of the handheld pocket-sized embodiment of the detector.

FIG. 1C is a functional layout of the handheld pocket sized embodiment of the detector.

Inside locating apparatus 10 is an array of sensors/emitters 9 which both transmit the signals and sense the reflected signals. These sensors/emitters 9 are directed in unique angles for their operation. Returned signals are communicated to computer 8. Computer 8 is activated by operator depression of switch 18. In the preferred embodiment, computer 8 directs each sensor/emitter within array 9 to first transmit a signal and then sense if a reflected signal is perceived. The time lapse between the transmission and sensing is used to gauge distance. If a sensor within array 9 receives a reflected signal, this occurrence is communicated to computer 8 which uses the time delay from transmission to receipt to estimate the distance to the golfball and to light the appropriate light 13 in display 11 (not shown- refer to FIG. 1D); additionally, computer 8 also directs speaker 6 to emit a sound so as to alert the operator that the golf-ball has been sensed.

The sound from speaker 6 alerts the operator that the golf-ball has been located; the operator then is able to check the display to obtain an estimate of the relative direction and distance to the golf ball.

The entire system receives power from battery 7.

Figure 1D:
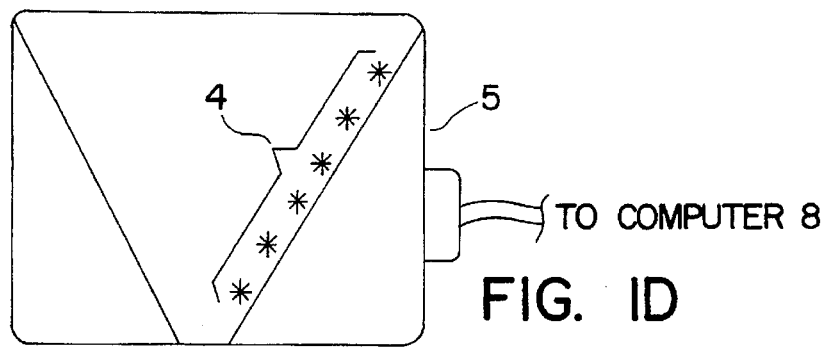
FIG. 1D illustrates the preferred display used in the handheld pocket-sized embodiment of the detector.

FIG. 1D illustrates the preferred display used in the handheld pocket sized embodiment of the detector.

Display 11 contains a fan-type array of lights. For ease of illustration, only one row of lights 4 is shown; each linear array of lights, such as 4, are aligned with one of the sensors/emitters 9 as described in FIG. 1C. The computer as shown in FIG. 1C, determines which light within array 4 corresponds to the estimated distance.

Although the light arrangement is not exact, its estimate and direction is sufficient to assist the operator in locating the golf-ball.

FIGS. 2A, 2B, and 2C illustrate three different ways that a coating is put onto the golf ball.

The preferred embodiment is shown in FIG. 2A in which a fabric material such as a towel 20 has been impregnated with a liquid material having the coating therein. As the towel is used to clean golf ball 14, a residue is left on the ball. The cleaning of the golf ball is usually done immediately prior to the ball being put in-play.

FIG. 2B illustrates another embodiment in which a clear liquid 22 having the metallic flakes or other reflective material suspended in the liquid, is sprayed from can 21 onto golf ball 14. This application is usually done once after the golf balls have been purchased and then as the coating is depleted.

In FIG. 2C, liquid 23 has reflective coating suspended and then the golf ball is dipped therein. The coating covers the entirety of the ball. This method provides for a thicker film than the other three techniques.

In all three techniques illustrated in FIGS. 2A, 2B, and 2C, the objective is to substantially cover the golf ball with the desired reflective coating. Since the entire ball is covered, the coating is better able to be sensed by the locating apparatus.

FIG. 3 is a perspective view of the "T" shaped embodiment of the invention in use.

User 34 holds the handle on shaft portion 30 after extending the wing portions 31A and 31B as illustrated by 32A and 32B respectively. Once so extended, wing portions 31A and 32B, in the preferred embodiment, include antennas which create a field affect. This field affect is disturbed by the coating on ball 14. The disturbance is measured by the sensing circuit (not shown) and an auditory alarm is emitted by speaker 33.

In the preferred embodiment of this locator apparatus, the auditory alarm is different depending on which of the winged portions 31A or 31B receive the largest disturbance to their fields. As example, if the golf ball is under winged portion 31A, more disturbance will be sensed by that winged portion resulting in a single beep being emitted. Alternatively, if winged portion 31B receives the greater disturbance, a dual beep is emitted.

In this way, user 34 is able to isolate and locate the ball.

Also note, in this embodiment of the invention, a single winged portion may be distended leaving the other in the up-right position. As example, if the area to be searched has a large number of bushes and tress, user 34 optionally lowers winged portion 31A and leaves winged portion 31B in the upright position. Either winged portion in the up-right position has its antennas deactivated.

During storage or transportation of the locating apparatus of FIG. 3, both winged portions are in the upright position creating a straight shaft which is easily stored in the golf-bag.

FIG. 4 is a close-up view of the "T" shaped embodiment showing the use of multiple antenna for locating a ball.

In this embodiment, multiple antennas (such as 41A and 41B) are located within each of the winged portions 31A. Although this illustration shows two antennas within the winged portion 31A, the invention contemplates any number, N, of antennas being positioned in the winged portion. N is an integer greater than one.

Each of the antennas generate a field as illustrated by 42A and 42B. As golf ball 14 interacts with these fields, the disturbance is sensed by computer/controller 40. By comparing the level of disturbance from each of the antennas, the antenna having the largest disturbance is determined as being nearest to the golf ball 14. Lights 45A and 45B are arranged to be proximate to antennas 41A and 41B respectively. In this illustration, computer 40 activates light 45B since antenna 41B records the largest disturbance.

The user, by monitoring the lights on the wings is able to identify the location of the golf ball to within a few inches.

Switch 43 monitors the position of the two winged portions and communicates an up/down status to computer 40 which monitors only the winged portion which is down and in the activated mode.

FIG. 5 is a flow-chart of the preferred embodiment illustrating the operation of the computer contained within the "T" shaped embodiment.

Once a start 50 has been encountered, the computer monitors the signals received 51. Note, as indicated in FIG. 4, if a winged portion is not in the downward activated state, as indicated by switch 43, no signal is received from that winged portion.

Of the signals received, the program identifies the largest signal 52A and then determines if it is past a predefined threshold 53. This decision 53 is used to filter out "noise" which might be caused by other objects which affect the field from the antennas but which are minor in nature.

If the threshold is passed, the proper light and or sound is made 52B so that the operator is able to locate the general location of the golf ball. The program then returns to monitor for the incoming signals.

FIG. 6 is a flow-chart of the computer operation of the handheld pocket-sized embodiment of the invention.

Once start 60 has begun, the next sensor/emitter is selected 61A. Initially this is the left most sensor/emitter and then sequences through the sensor/emitter array and returns to the left most sensor/emitter. A signal is transmitted 61B from the selected sensor/emitter and the time is recorded.

A return or reflected signal is then monitored 62A. If no signal is received, then a check is made to see if the monitoring should continue 62B. In the preferred embodiment, the monitoring of each sensor/emitter is for less than a tenth of a second meaning that an apparatus which has eight sensors/emitters will cycle through the entire array each second. If the time has not elapsed, 62B, then the program cycles back to continue to monitor for signals 62A; otherwise, the next sensor/emitter is selected 61A.

When a signal is received, 62A, the signal is checked to see if it is past a certain threshold 62C. If the signal is too weak, the next sensor/emitter is chosen 61A; otherwise, the program knows that the golf ball has been sensed.

In this case, the estimated distance is calculated 61C from the locating apparatus to the golf ball based upon the time for the signal to be reflected from the coating on the golf ball. Using this distance estimate, the proper light on the display panel associated with the sensor/emitter is illuminated 61D and the buzzer is sounded 61E. Afterwards, the program returns to choose another sensor/emitter 61A.

In this manner, the relative location and distance to the golf ball is established so as to permit the user to "home in" on the lost golf ball.

It is clear from the foregoing that the present invention creates an improved apparatus to locate a golf ball and an improved method of applying a coating to golf ball.

What is claimed is:

1. A golf ball locating combination comprising:

a golf ball;

means for applying a coating to said golf ball;

a handheld locating apparatus having, means for sensing said coating on said golf ball, and, an operator interface means for identifying a location of said golf ball relative to said locating apparatus, wherein said handheld locating apparatus includes a shaft portion having an operator handle on a first end thereof and two hinged wing portions swivelly attached to a second end of said shaft portion, each of said hinged wing portions having antenna means for sensing said coating.

2. The improved golf ball locating combination according to claim 1 further including:

a) auditory means, mounted to said shaft portion, for emitting an auditory signal; and, b) control means, connected to said auditory means and each of said antennas in said hinged wing portions, said control means for monitoring the antenna means in each of said hinged wing portions and causing said auditory means to generate an auditory signal indicative of which antenna in said two hinged wing portions receives a stronger reflected signal.

3. The improved golf ball locating combination according to claim 2 wherein said control means include threshold means for inhibiting said auditory means until a signal from either of said antennas on said hinged wing portions exceeds a pre-selected level.

4. The improved golf ball locating combination according to claim 1 wherein each of said hinged wing portions contains N, N being an integer greater than 1, spaced apart antennas and N light emitting apparatus, and further including a control means connected to each of said antennas and each of said light emitting apparatus, said control means for activating one of said light emitting apparatus associated with an antenna receiving a strongest signal from said coating on said golf ball.

5. The improved golf ball locating combination according to claim 1 further including positional sensing means for disengaging said antennas within each of said winged portions when said winged portion is not in an extended position.

6. A handheld apparatus for locating golf balls having a coating thereon, said handheld apparatus comprising:

a) means for sensing said coating on said golf ball, b) an operator interface means for identifying a location of said golf ball relative to said handheld apparatus, c) means for emitting a signal being reactive with said coating, d) means for applying a coating to a golf ball, and e) the golf ball, wherein said handheld apparatus is pocket sized and has a forward facing window for emitting said signal across a controlled range.

7. The improved golf ball locating combination according to claims 4 or 6 wherein said means for applying includes a liquid matter applied to said golf ball.

8. The improved golf ball locating combination according to claim 7 further including a fabric material impregnated with said liquid matter, and wherein said liquid matter is applied immediately before said golf ball is put in play by wiping said liquid matter onto said golf ball using said fabric material.

9. The improved golf ball locating combination according to claim 7 wherein said liquid matter substantially covers said golf ball.

10. The improved golf ball locating combination according to claim 9 wherein said liquid matter dries substantially clear.

11. The improved golf ball locating combination according to claim 10 wherein said liquid matter is reflective of a radiation at a selected frequency.

12. The handheld apparatus according to claim 6 further including a filter means disposed over said forward facing window for filtering signals reflected from said golf ball.

13. The handheld apparatus of claim 6 wherein the sensing means is a CCD sensor, the interface means includes a computer and a display that generates a locating light, and the emitting means is an emitter that emits an array of light beams.

* * * * *